United States Patent
Huh et al.

(10) Patent No.: US 9,755,213 B2
(45) Date of Patent: Sep. 5, 2017

(54) CATHODE INCLUDING INSULATION LAYER ON CATHODE TAB AND SECONDARY BATTERY INCLUDING THE CATHODE

(71) Applicant: LG CHEM, LTD., Seoul (KR)

(72) Inventors: Jun Woo Huh, Daejeon (KR); Hyuk Su Kim, Daejeon (KR); Dae Geun Ku, Daejeon (KR); Hyang Mok Lee, Daejeon (KR); Chang Bum Ahn, Daejeon (KR)

(73) Assignee: LG CHEM, LTD., Seoul (KR)

(*) Notice: Subject to any disclaimer, the term of this patent is extended or adjusted under 35 U.S.C. 154(b) by 0 days.

(21) Appl. No.: 14/283,559

(22) Filed: May 21, 2014

(65) Prior Publication Data

US 2014/0255778 A1    Sep. 11, 2014

Related U.S. Application Data

(63) Continuation of application No. PCT/KR2014/001759, filed on Mar. 4, 2014.

(30) Foreign Application Priority Data

Mar. 11, 2013    (KR) .......................... 10-2013-0025785

(51) Int. Cl.
*H01M 4/66* (2006.01)
*H01M 2/26* (2006.01)
*H01M 4/70* (2006.01)
*H01M 4/04* (2006.01)

(52) U.S. Cl.
CPC ........... *H01M 2/26* (2013.01); *H01M 4/0404* (2013.01); *H01M 4/70* (2013.01)

(58) Field of Classification Search
None
See application file for complete search history.

(56) References Cited

U.S. PATENT DOCUMENTS

| | | | |
|---|---|---|---|
| 2004/0202928 A1* | 10/2004 | Miyamoto | H01M 4/0402 429/137 |
| 2009/0111011 A1* | 4/2009 | Kim | H01M 2/14 429/133 |
| 2010/0248026 A1* | 9/2010 | Hinoki et al. | 429/209 |
| 2012/0082891 A1 | 4/2012 | Ahn | |

FOREIGN PATENT DOCUMENTS

| | | | |
|---|---|---|---|
| EP | 2450989 | * | 5/2012 |
| JP | 2004-158434 A | | 6/2004 |
| JP | 2005-166581 A | | 6/2005 |
| JP | 2009-181899 A | | 8/2009 |
| JP | 2011-81992 A | | 4/2011 |
| JP | 2011-216403 A | | 10/2011 |

OTHER PUBLICATIONS

International Search Report, dated Jun. 12, 2014, for International Application No. PCT/KR2014/001759.
Extended European Search Report, dated Jan. 26, 2015, issued in European Application No. 14741496.5.
European Office Action dated Mar. 20, 2017 in European Application No. 14741496.5.

* cited by examiner

*Primary Examiner* — Ladan Mohaddes
(74) *Attorney, Agent, or Firm* — Birch, Stewart, Kolasch & Birch, LLP

(57) ABSTRACT

Provided is a cathode including a cathode current collector, a cathode tab protruding from the cathode current collector, and an insulation layer coated with an insulating material on the cathode tab, and a secondary battery including the cathode. Since the cathode of the present invention includes an insulation layer on a cathode tab, the present invention may prevent an internal short circuit which may occur due to cell deformation or sharp edges of electrodes, which are formed during cutting of the electrodes in a preparation process of the battery, when the electrodes are stacked, or may prevent a physical short circuit between the cathode and the anode due to shrinkage of a separator in a high-temperature atmosphere. In a case where the cathode is used in a lithium secondary battery, safety and reliability in battery performance may be significantly improved.

11 Claims, 4 Drawing Sheets

CATHODE INCLUDING INSULATION LAYER ON CATHODE TAB AND SECONDARY BATTERY INCLUDING THE CATHODE

CROSS REFERENCE TO RELATED APPLICATIONS

This application is a Continuation of PCT International Application No. PCT/KR2014/001759 filed on Mar. 4, 2014, which claims priority under 35 U.S.C. §119(a) to Patent Application No. 10-2013-0025785 filed in the Republic of Korea on Mar. 11, 2013, all of which are hereby expressly incorporated by reference into the present application.

TECHNICAL FIELD

The present invention relates to a cathode including a cathode current collector, a cathode tab protruding from the cathode current collector, and an insulation layer coated with an insulating material on the cathode tab, and a secondary battery including the cathode.

BACKGROUND ART

Demand for secondary batteries as an energy source has been rapidly increased as technology development and demand with respect to mobile devices have increased, and as a result, a significant amount of research into batteries that can meet various demands has been conducted.

Typically, in terms of the shape of the battery, demand for prismatic type batteries and pouch type batteries having a thin profile which may be used in products, such as mobile phones, is high, and, in terms of materials, demand for lithium secondary batteries, such as lithium cobalt polymer batteries having excellent energy density, discharge voltage, and safety, is high.

One of major research projects of these secondary batteries is the improvement of safety. A leading cause of safety-related, incidents in batteries is attributed to the attainment of an abnormal high-temperature state due to a short circuit between a cathode and an anode. That is, under normal circumstances, a separator is disposed between the cathode and the anode to maintain electrical insulation. However, there may be limitations in using a typical separator alone under abnormal misuse or abuse conditions, for example, the occurrence of overcharge or overdischarge of the battery, or dendritic growth of an electrode material or the occurrence of an internal short circuit due to foreign. matter, or the penetration of the battery by sharp objects such as nails and screws, or excessive deformation of the battery by external force.

In general, a microporous membrane formed of a polyolefin resin is mainly used as a separator. However, since the heat resistance temperature thereof is in a range of about 120° C. to about 160° C., heat resistance properties may be insufficient. Therefore, when the internal short circuit occurs, a state of thermal runaway may be attained in which the separator shrinks due to short circuit reaction heat to enlarge a short-circuit part and generate much more reaction heat.

Also, as illustrated in FIG. 1, a secondary battery is generally prepared in a prismatic shape by cutting a cathode and an anode in an appropriate size and stacking several sheets. In this case, since edges of the cathode or the anode that is coated with a polymer electrolyte may include sharp parts having an inconspicuous tiny needle shape, a microscopic internal short circuit may occur in these parts when the electrodes are stacked. Thus, the performance of the battery may be adversely affected. In particular, since the edges have more irregular surfaces than the inside when coating the polymer electrolyte, the edges are not evenly coated. Thus, a short circuit is likely to occur. Also, when upper and lower layers of The electrodes are even slightly misaligned with each other while stacking the electrodes, a short circuit between the cathode and the anode may occur.

Thus, various methods for reducing the possibility of cell deformation, external impact, or a physical short circuit between the cathode and the anode have been studied.

For example, in order to prevent the occurrence of a short circuit caused by moving an electrode assembly in a state in which the battery is completed to allow an electrode tab to be in contact with an upper end of the electrode assembly, there is a method of attaching a predetermined sized insulation tape on the electrode tab near an upper end of a current collector. Typically, a polyimide film is used as the insulation tape, and it is generally recommend that the insulation tape is wrapped to a slightly extended length from the upper end of the current collector to the bottom. Also, in order to prevent loosening, the insulation tape is typically wrapped twice or three times.

However, such a winding operation of the insulation tape may be highly complicated, and in the case that the insulation tape is wrapped to a slightly extended length from the upper end of the current collector to the bottom, the above wrapped portion may cause an increase in the thickness of the electrode assembly. Furthermore, the wrapped portion may be easily loosened during the bending of the electrode tab.

DISCLOSURE OF THE INVENTION

Technical Problem

The present invention provides a cathode including a cathode tab which may minimize the possibility of a physical short circuit between a cathode and an anode due to cell deformation or shrinkage of a separator in a high-temperature atmosphere, and a secondary battery including the cathode.

Technical Solution

According to an aspect of the present invention, there is provided a cathode including a cathode current collector; a cathode tab protruding from the cathode current collector; and an insulation layer coated with an insulating material on the cathode tab.

According to another aspect of the present invention, There is provided a secondary battery including the cathode; an anode; and a separator disposed between the cathode and the anode.

Advantageous Effects

The present invention may further reduce the possibility of a physical short circuit between a cathode and an anode due to cell deformation or shrinkage of a separator in a high-temperature atmosphere by including an insulation layer that is coated with an insulating material on a cathode tab. In addition, safety and reliability in battery performance may be significantly improved.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A cathode according to an embodiment of the present invention may include a cathode current collector, a cathode tab protruding from the cathode current collector, and an insulation layer coated with an insulating material on the cathode tab.

According to an embodiment of the present invention, since the cathode including the insulation layer on the cathode tab may significantly reduce a preparation process of a battery, the cathode may eventually reduce preparation costs of the battery and may further improve the safety of the battery by enlarging an insulation area. In addition, limitations which may occur when using a typical insulating film or tape, that is, the possibility of exfoliation during the bending of the cathode tab for the attachment to the corresponding portion may be very low and an increase in the thickness of an electrode assembly may not be induced.

The cathode tab according to an embodiment of the present invention may be formed in a structure in which at least one side of the cathode tab is coated with an electrically insulating material (hereinafter, simply referred to as "insulating material").

According to an embodiment of the present invention, the insulating material may include any one selected from The group consisting of butyl acrylate, styrene, acrylic acid, hydroxyethyl acrylate, and a styrene-butadiene rubber (SBR), or a mixture of two or more thereof. The insulating material may be an aqueous solution in which the insulating material is dispersed in an amount of 10 wt % to 90 wt % in water.

According to an embodiment of the present invention, the cathode tab and the cathode current collector are formed in one piece and the cathode tab may be any one selected from the group consisting of an aluminum foil, an aluminum mesh, or equivalents thereof.

Figure 1:
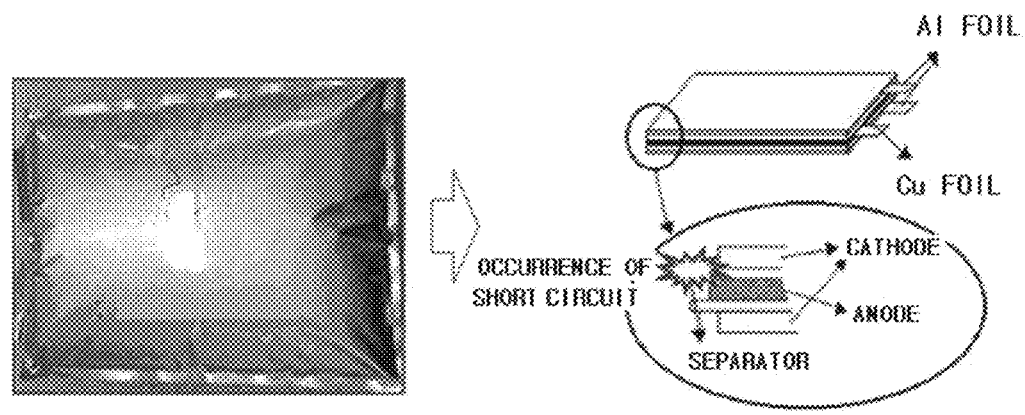
FIG. 1 illustrates a typical example of the occurrence of a short circuit in a secondary battery.
Figure 2A:
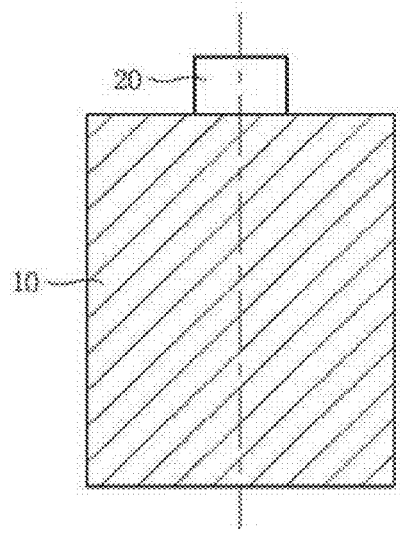
FIGS. 2A and 2B are respectively a plan view (2A) and a side sectional view (2B) illustrating a cathode including a cathode tab which protrudes from a typical cathode current collector.
Figure 2B:
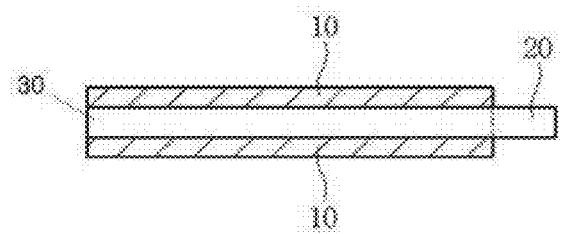

FIG. 2A and FIG. 2B are respectively examples of a plan view (2A) and a side sectional view (2B) illustrating a cathode including a cathode tab which protrudes from a typical cathode current collector.

Specifically, as illustrated in FIG. 2A and FIG. 2B, the cathode includes a cathode active material coating portion 10 on one side or both sides of a cathode current collector 30, and a cathode tab 20, as a non-coating portion which does not include the cathode active material coating portion, may be formed at one end of the cathode current collector 30.

The cathode tab according to an embodiment of the present invention may be formed by notching a continuous cathode sheet, in which the one side or both sides of the cathode current collector are coated with an active material, at a spacing of a unit electrode using dies.

Figure 3A:
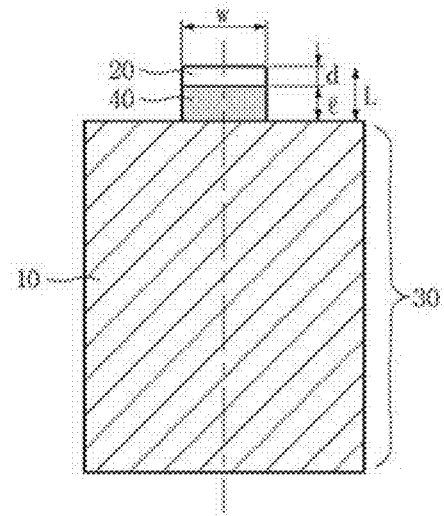
FIGS. 3A and 3B are respectively a plan view (3A) and a side sectional view (3B) illustrating a cathode including an insulation layer on a cathode tab that is composed of a non-coating portion, according to an embodiment of the present invention.
Figure 3B:
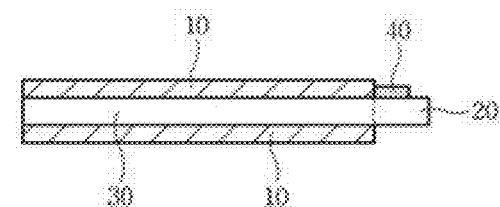
Figure 4:
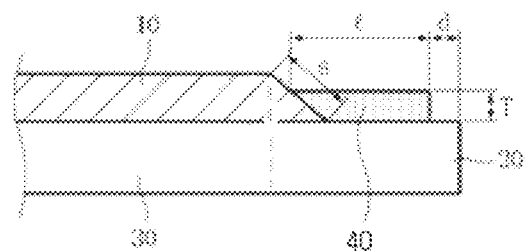
FIGS. 4 to 6 are side sectional views respectively illustrating cathodes including an insulation layer on a cathode tab including a cathode active material coating portion, according to an embodiment of the present invention.
Figure 5:
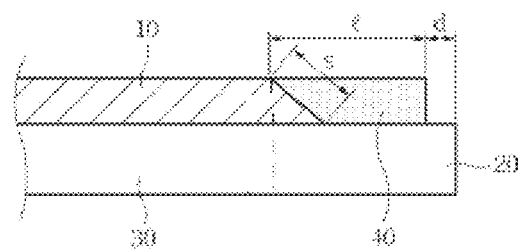
Figure 6:
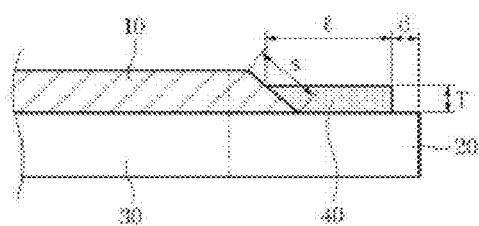

According to the present invention, the cathode tab formed after the notching may be formed as the non-coating portion which does not include the cathode active material coating portion as illustrated in FIGS. 2A, 2B, 3A and 3B, and may include a portion of the cathode active material coating portion as illustrated in FIGS. 4 to 6.

The coating portion of the insulation layer according to an embodiment of the present invention may be changed according to various factors such as a structure of the battery. However, the present invention is not limited thereto. Examples of the coating portion will be described with reference to FIGS. 3 to 6 as follows:

First, referring to FIG. 3, FIGS. 3A and 3B are respectively a plan view (3A) and a side sectional view (3B) illustrating a cathode including a cathode tab that is composed of a non-coating portion, according to an embodiment of the present invention.

Specifically, referring to FIG. 3A and FIG. 3B, the cathode includes a cathode active material coating portion 10 on one side or both sides of a cathode current collector 30, and a cathode tab 20, which is formed at one end of the cathode current collector 30 as a non-coating portion that does not include the cathode active material coating portion, may include an insulation layer 40 coated with an insulating material on one side or both sides thereof.

According to an embodiment of the present invention, in FIG. 3A, the insulation layer 40 may be coated in an amount of 10% to 90% of a total length (d+l) of the cathode tab 20 in a protruding direction L of the cathode tab 20, and for example, a length l of the insulation layer may be in a range of 1 mm to 10 mm. The insulation layer 40 may be coated to have the same width as a width w of the cathode tab 20 which is perpendicular to the protruding direction L of the cathode tab 20. However, the present invention is not limited thereto.

The cathode tab 20 according to another embodiment of the present invention may include a portion of a cathode active material coating portion 10 as illustrated in FIGS. 4 to 6.

Referring to FIGS. 4 to 6, the cathode according to an embodiment of the present invention may include the cathode active material coating portion 10 on one side or both sides of a cathode current collector 30, and the cathode tab 20 protruding from the current collector 30 may include a portion of the cathode active material coating portion 10. The cathode active material coating portion 10 may include an inclined portion in which the thickness thereof is decreased along a protruding direction of the cathode tab 20.

Also, according to an embodiment of the present. invention, the cathode active material coating portion formed on the cathode tab, as illustrated in FIG. 6, may further include a flat portion between the cathode current collector and the inclined portion, for example, between the cathode active material coating portion formed on the cathode current collector and the inclined portion.

According to an embodiment of the present invention, an insulation layer 40 may be coated on the cathode tab 20 while including the cathode active material coating portion 10. The cathode active material coating portion 10 formed on the cathode tab 20 may be a portion of the cathode active material coating portion 10 formed on the cathode current collector 30 which extends onto the cathode tab 20. Therefore, the cathode active material coating portion 10 formed on the cathode tab 20 may have the same material as the cathode active material coating portion 10 formed. on the cathode current collector 30.

The insulation layer 40 may include a portion (see FIGS. 4 and 6) or all (see FIG. 5) of an inclined surface of the inclined portion of the cathode active material, coating portion 10, and may be formed by being coated in an amount of 10% to 90% of a total length (d+l) of the cathode tab 20 in the protruding direction of the cathode tab 20. For example, a length l of the insulation layer may be in a range of 1 mm to 10 mm, and the insulation layer 40 may be coated to have the same width as a width of the cathode tab 20 which is perpendicular to the protruding direction of the cathode tab 20. However, the present invention is not limited thereto.

According to an embodiment of the present invention, the insulation layer 40, as illustrated in FIGS. 4 and 6, may be coated in an amount of 10% to 90% of the total length (d+l) of the cathode tab in the protruding direction of the cathode tab from ½ of an inclined length S of the inclined portion of the cathode active material coating portion 10 on the cathode tab 20.

Also, as illustrated in FIG. 5, the insulation layer 40 may be coated in an amount of 10% to 90% of the total length (d+l) of the cathode tab in the protruding direction of the cathode tab while including the entire inclined surface (entire inclined length S) of the inclined portion of the cathode active material coating portion 10 on the cathode tab 20.

The insulation layer 40 may be coated to a thickness T of 50% to 100% of a thickness of the cathode active material coating portion 10 on the cathode tab 20, and for example, the thickness T of the insulation layer 40 may be in a range of 1 μm to 100 μm. In the case that the coating thickness T of the insulation layer is excessively thin, desired electrical insulating properties may be difficult to be obtained. In contrast, in the case in which the coating thickness T of the insulation layer is excessively thick, it may be undesirable because solidification time of the coating layer may increase or an increase in the thickness of the coating layer may be induced.

According to an embodiment of the present invention, that the insulation layer 40 includes a portion of the cathode active material coating portion 10 is for preventing the occurrence of a gap, in which the insulation layer is not formed between the cathode active material coating portion 10 and the cathode tab 20.

A coating method of the insulation layer that is formed on the one side or both sides of the cathode tab may also vary. For example, the insulation layer may be formed by spray coating an aqueous solution including an insulating material, on the cathode tab.

According to an embodiment of the present invention, the coating of the insulating material on the cathode tab may be performed in any step of the preparation process of the secondary battery. However, the present invention is not limited thereto.

For example, one side or both sides of a cathode current collector are coated with a cathode active material, and a non-coating portion of the cathode current collector or a non-coating portion as well as a portion of a cathode active material coating portion is then coated with an insulating material to form an insulation layer. Then, a cathode tab including the insulation layer may be obtained by notching the product thus obtained into a desired shape of the cathode tab using dies.

As another example of the present invention, a cathode tab is formed by notching a continuous cathode sheet, in which one side or both sides of a cathode current collector are coated with a cathode active material, into a desired shape of the cathode tab at a spacing of a unit electrode using dies, and a cathode tab including an insulation layer may then be obtained by coating the cathode tab thus formed with an insulating material.

Moisture in the cathode coated with the insulating material may be removed by completely drying the coating layer using a drying method typically known in the art. The drying may be performed using a hot air method, a direct heating method, and an induction heating method at a temperature at which moisture is entirely evaporated. However, the present invention is not limited thereto.

Also, the present invention may provide a secondary battery including the cathode, an anode, and a separator disposed between the cathode and the anode.

Figure 7:
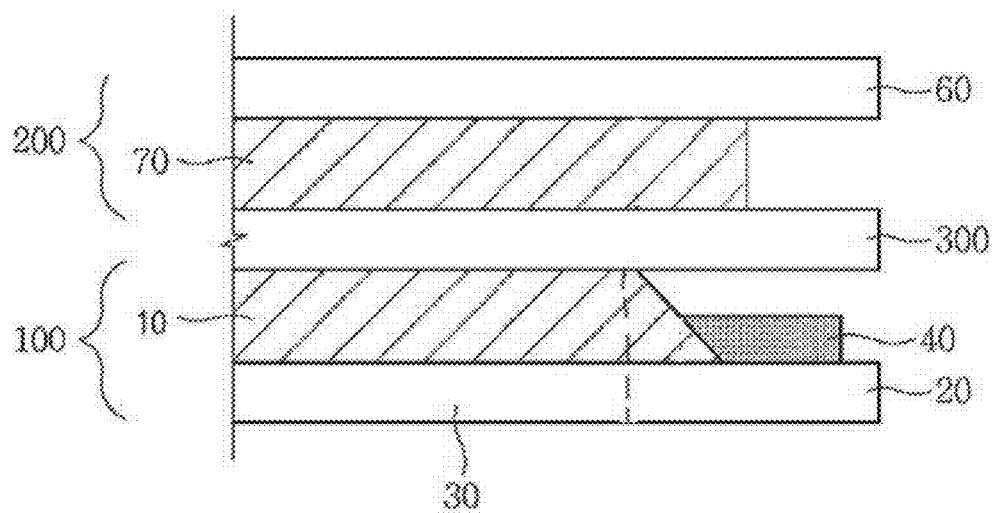
FIG. 7 is a schematic view illustrating a secondary battery including a cathode tab which includes an insulation layer, according to an embodiment of the present invention.

FIG. 7 is a schematic view illustrating a secondary battery according to an embodiment of the present invention. The secondary battery according to the embodiment of the present invention may include a cathode 100 including a cathode active material coating portion 10 on a cathode current collector 30; an anode 200 including an anode active material coating portion 70 on an anode current collector 60; and a separator 300 disposed between the cathode 100 and the anode 200, wherein a cathode tab 20 including an insulation layer 40, which is coated with an insulating material, extends in the cathode.

According to an embodiment of the present invention, a cathode active material used may be any one selected from the group consisting of lithium-containing transition metal oxides or equivalents thereof. Specifically, the cathode active material, for example, may include a manganese-based spinel active material, lithium metal oxide, or a mixture thereof. Furthermore, the lithium metal oxide may be selected from the group consisting of lithium-manganese-based oxide, lithium-nickel-manganese-based oxide, lithium-manganese-cobalt-based oxide, and lithium-nickel-manganese-cobalt-based oxide, and for example, may include $LiCoO_2$, $LiNiO_2$, $LiMnO_2$, $LiMn_2O_4$, $Li(Ni_aCo_b Mn_c)O_2$ (where $0<a<1$, $0<b<1$, $0<c<1$, and $a+b+c=1$), $LiNi_{1-y}Co_yO_2$, $LiCo_{1-y}Mn_yO_2$, $LiNi_{1-y}Mn_yO_2$ (where $0 \leq Y<1$), $Li(Ni_aCo_bMn_c)O_4$ (where $0<a<2$, $0<b<2$, $0<c<2$, and $a+b+c=2$), $LiMn_{2-z}Ni_zO_4$, and $LiMn_{2-z}Co_zO_4$ (where $0<z<2$).

Also, any one selected from the group consisting of an aluminum foil, an aluminum, mesh, or equivalents thereof may be used as the cathode current collector. However, the present invention is not limited thereto.

Copper may be used as the anode current collector according to an embodiment of the present invention. As an anode active material, a carbon-based anode active material, such as crystalline carbon, amorphous carbon, or a carbon. composite, may be used alone or in combination of two or more thereof. However, the present invention is not limited thereto.

Thicknesses of the cathode and the anode may be in a range of about 10 μm to about 100 μm, and thicknesses of the active materials coated on the current collectors may be in a range of about 50 μm to about 200 μm. However, the present invention is not limited thereto.

According to an embodiment of the present invention, an anode may be prepared to be larger than a cathode in order to prevent a physical short circuit between the cathode and the anode.

Also, a separator may be inserted between the cathode and the anode in order to prevent a physical short circuit between the cathode and the anode. A porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination of two or more thereof as the separator. In addition, a typical porous nonwoven fabric, for example, a nonwoven fabric formed of high melting point glass fibers or polyethylene terephthalate fibers may be used. However, the separator is not limited thereto.

A shape of a battery case accommodating the secondary battery according to the present invention is not particularly limited, and for example, the battery case may be a cylindrical type using a can, a prismatic type, or a pouch type. In particular, the present invention may be used in a prismatic type battery having significant side effects due to the attachment of an insulating film.

The cathode tab, on which an insulation layer including an insulating material is coated according to an embodiment of present invention, may prevent an internal short circuit which may occur due to cell deformation or sharp edges of electrodes, which are formed during cutting of the electrodes in a preparation process of the battery, when the electrodes are stacked, or may prevent a physical short circuit between the cathode and the anode due to shrinkage of a separator in a high-temperature atmosphere. Thus, a battery having significantly improved safety and reliability may be prepared, and furthermore, commercialization of the secondary battery may be facilitated.

Reference Numerals

10: CATHODE ACTIVE MATERIAL COATING PORTION
20: CATHODE TAB
30 CATHODE CURRENT COLLECTOR
40: INSULATION LAYER
100: CATHODE 200: ANODE 300: SEPARATOR
d: NON-COATING PORTION
l: LENGTH OF INSULATION LAYER
w: WIDTH OF INSULATION LAYER
T: THICKNESS OF INSULATION LAYER

INDUSTRIAL APPLICABILITY

Since an insulation layer formed of an insulating material is included on a cathode tab, the present invention may reduce the possibility a physical short circuit between a cathode and an anode due to cell deformation or shrinkage of a separator in a high-temperature atmosphere. In addition, safety and reliability in battery performance may be significantly improved.

The invention claimed is:

1. A cathode comprising:
a cathode current collector;
a cathode tab protruding from the cathode current collector;
an insulation layer made of an insulating material and coated on the cathode tab, wherein the insulating material comprises any one selected from the group consisting of butyl acrylate, styrene, acrylic acid, hydroxyethyl acrylate, and a styrene-butadiene rubber (SBR), or a mixture of two or more thereof; and
a cathode active material layer, wherein the cathode active material layer is present on the cathode current collector and is present on a portion of the cathode tab,
wherein the cathode active material layer that is present on a portion of the cathode tab comprises an inclined portion in which a thickness thereof is decreased along a protruding direction of the cathode tab,
wherein a width of the cathode tab in a direction perpendicular to the protruding direction is less than a width of the cathode current collector in the direction perpendicular to the protruding direction, and
wherein the insulation layer is coated on an inclined surface of the inclined portion but less than the entire length of the inclined surface of the inclined portion and is coated in an amount of 10% to 90% of a total length of the cathode tab in the protruding direction of the cathode tab.

2. The cathode of claim 1, wherein the insulation layer is coated in an amount of 10% to 90% of a total length of the cathode tab in the protruding direction of the cathode tab from ½ of an inclined length of the inclined portion.

3. The cathode of claim 1, wherein the cathode active material coating comprises a flat portion between the cathode current collector and the inclined portion.

4. The cathode of claim 1, wherein the insulation layer is coated to a thickness of 50% to 100% of a thickness of the cathode active material coating present on the portion of the cathode tab.

5. The cathode of claim 1, wherein a length of the insulation layer is in a range of 1 mm to 10 mm.

6. The cathode of claim 1, wherein a thickness of the insulation layer is in a range of 1 μm to 100 μm.

7. A secondary battery comprising:
the cathode of claim 1;
an anode; and
a separator disposed between the cathode and the anode.

8. The secondary battery of claim 7, wherein the anode is larger than the cathode.

9. The secondary battery of claim 7, wherein the secondary battery is a cylindrical, prismatic, or pouch type battery.

10. The cathode of claim 1, wherein the insulation layer is formed by dispersing the insulating material in an aqueous solution, coating the dispersed insulating material on the cathode tab, and then drying the coated insulation layer.

11. A cathode comprising:
a cathode current collector;
a cathode tab protruding from the cathode current collector;
an insulation layer made of an insulating material and coated on the cathode tab, wherein the insulating material comprises any one selected from the group consisting of butyl acrylate, styrene, acrylic acid, hydroxyethyl acrylate, and a styrene-butadiene rubber (SBR), or a mixture of two or more thereof; and
a cathode active material layer, wherein the cathode active material layer is present on the cathode current collector and is present on a portion of the cathode tab,
   wherein the cathode active material layer that is present on a portion of the cathode tab comprises an inclined portion extending from a width of the cathode active material down to the current collector in which a thickness thereof is decreased along a protruding direction of the cathode tab,
   wherein a width of the cathode tab in a direction perpendicular to the protruding direction is less than a width of the cathode current collector in the direction perpendicular to the protruding direction, and
   wherein the insulation layer is coated in an amount of 10% to 90% of a total length of the cathode tab in the protruding direction of the cathode tab from ½ of an inclined length of the inclined portion and has a thickness of 50% to 100% of a thickness of the cathode active material coating portion on the cathode tab.

* * * * *